(12) United States Patent
Gupta et al.

(10) Patent No.: US 11,428,154 B2
(45) Date of Patent: Aug. 30, 2022

(54) NOZZLE VANE

(71) Applicant: MITSUBISHI HEAVY INDUSTRIES ENGINE & TURBOCHARGER, LTD., Sagamihara (JP)

(72) Inventors: Bipin Gupta, Tokyo (JP); Toyotaka Yoshida, Tokyo (JP); Yosuke Dammoto, Sagamihara (JP); Yoji Akiyama, Sagamihara (JP); Sambhav Jain, Sagamihara (JP)

(73) Assignee: MITSUBISHI HEAVY INDUSTRIES ENGINE & TURBOCHARGER, LTD., Sagamihara (JP)

(*) Notice: Subject to any disclaimer, the term of this patent is extended or adjusted under 35 U.S.C. 154(b) by 0 days.

(21) Appl. No.: 17/056,928

(22) PCT Filed: Dec. 19, 2018

(86) PCT No.: PCT/JP2018/046816
§ 371 (c)(1),
(2) Date: Nov. 19, 2020

(87) PCT Pub. No.: WO2020/129192
PCT Pub. Date: Jun. 25, 2020

(65) Prior Publication Data
US 2021/0131344 A1  May 6, 2021

(51) Int. Cl.
*F02B 37/24* (2006.01)
*F01D 17/16* (2006.01)
*F01D 5/14* (2006.01)

(52) U.S. Cl.
CPC ............ *F02B 37/24* (2013.01); *F01D 17/165* (2013.01); *F01D 5/141* (2013.01);
(Continued)

(58) Field of Classification Search
CPC ........ F02B 37/24; F01D 17/165; F01D 5/141; F05D 2220/40; F05D 2240/128;
(Continued)

(56) References Cited

U.S. PATENT DOCUMENTS 5,318,249 A * 6/1994 Stoner .................. B64C 3/14
 244/35 R
6,264,429 B1 * 7/2001 Koeller ............... F04D 29/324
 416/DIG. 2

(Continued)

FOREIGN PATENT DOCUMENTS

DE  102009014004 A1  9/2010
EP    1635038 A1  3/2006
(Continued)

OTHER PUBLICATIONS

Extended European Search Report, dated Feb. 4, 2021, for European Application No. 18943562.1.
(Continued)

*Primary Examiner* — J. Todd Newton
(74) *Attorney, Agent, or Firm* — Birch, Stewart, Kolasch & Birch, LLP

(57) ABSTRACT

A nozzle vane for a variable geometry turbocharger satisfies 0.45<(Xp/L)≤0.60, where L is a chord length of the nozzle vane, and Xp is a distance between a leading edge of the nozzle vane and a rotation center of the nozzle vane.

10 Claims, 13 Drawing Sheets

(52) U.S. Cl.
CPC .... *F05D 2220/40* (2013.01); *F05D 2240/128* (2013.01); *F05D 2250/711* (2013.01); *F05D 2250/712* (2013.01); *F05D 2250/713* (2013.01); *F05D 2260/30* (2013.01)

(58) Field of Classification Search
CPC ......... F05D 2250/711; F05D 2250/712; F05D 2250/713; F05D 2260/30; F05D 2240/12
See application file for complete search history.

(56) References Cited

U.S. PATENT DOCUMENTS

| | | | | |
|---|---|---|---|---|
| 9,835,045 | B2* | 12/2017 | Laubender | F01D 17/165 |
| 9,890,700 | B2* | 2/2018 | Sun | F01D 17/165 |
| 10,033,163 | B1* | 7/2018 | Sumoyama | H01T 21/02 |
| 2004/0047727 | A1* | 3/2004 | Vogiatzis | F01D 17/165 |
| | | | | 415/163 |
| 2009/0104023 | A1* | 4/2009 | Favray | F02C 6/12 |
| | | | | 415/208.2 |
| 2010/0296924 | A1* | 11/2010 | Boning | F01D 17/162 |
| | | | | 415/208.1 |
| 2014/0112764 | A1* | 4/2014 | Morita | F01D 17/165 |
| | | | | 415/165 |
| 2014/0341729 | A1* | 11/2014 | Osako | F02B 37/24 |
| | | | | 415/208.1 |

FOREIGN PATENT DOCUMENTS

| | | |
|---|---|---|
| EP | 1797283 B1 | 12/2013 |
| JP | 10-205340 A | 8/1998 |
| JP | 2002-508043 A | 3/2002 |
| JP | 2011-509371 A | 3/2011 |
| JP | 2012-246807 A | 12/2012 |
| JP | 2013-137017 A | 7/2013 |

OTHER PUBLICATIONS

International Preliminary Report on Patentability and Written Opinion of the International Searching Authority, with an English translation, dated Jul. 1, 2021, for International Application No. PCT/JP2018/046816.

International Search Report, dated Feb. 26, 2019, for International Application No. PCT/JP2018/046816, with an English translation.

* cited by examiner

NOZZLE VANE

TECHNICAL FIELD

The present disclosure relates to a nozzle vane for a variable geometry turbocharger.

BACKGROUND

In recent years, a variable geometry turbocharger capable of changing a flow characteristic of the exhaust gas by adjusting the opening degree of a nozzle has been mounted on an automobile for the purpose of improving the fuel efficiency. A configuration of such a variable geometry turbocharger is disclosed in Patent Document 1. The variable geometry turbocharger is provided with an actuator configured to rotate a nozzle vane for adjusting the opening degree of the nozzle. The nozzle vane rotates with a torque that is the sum of the torque provided by the actuator, the torque provided by the exhaust gas, and the friction that acts upon rotation of the nozzle vane.

When a value of the torque that rotates the nozzle vane in a direction of increasing the opening degree of the nozzle is defined as positive, in the conventional nozzle vane, the torque tends to decrease with an increase in mass flow rate of the exhaust gas, and when the mass flow rate of the exhaust gas is sufficiently large, the torque may have a negative value, so that the nozzle opening degree may decrease. If the torque when the actuator breaks during operation of the variable geometry turbocharger is negative, the nozzle opening degree decreases, so that the flow velocity of the exhaust gas flowing from the nozzle to a turbine wheel increases, and the rotational speed of the turbine wheel increases. This may lead to over boost and failure of an engine.

Further, as negative torque means that the friction is dominant, when the torque is negative, the opening degree of the nozzle is not always the same even with the same torque provided by the actuator. As a result, hysteresis may occur in the exhaust gas mass flow rate, and the air-fuel ratio and engine output may decrease.

CITATION LIST

Patent Literature

Patent Document 1: EP1797283B

SUMMARY

Problems to be Solved

In order to suppress a risk of engine failure and a decrease in air-fuel ratio and engine output, it is necessary to increase the torque over the entire range of the exhaust gas mass flow rate. However, in increasing the torque in the existing variable geometry turbocharger, there are constraints of: 1) the position of the rotation center of the nozzle vane; 2) the number of nozzle vanes; and 3) the fixed position of the trailing edge of the nozzle vane when the nozzle is fully open. These constraints are based on the fact that changes in 1) and 2) affect the resonance mode of the turbine wheel by nozzle wake, and changes in 3) change the maximum allowable mass flow rate of the exhaust gas.

In order to increase the torque, Patent Document 1 proposes that the nozzle vane is shaped to satisfy $0.25<(Xp/C)<0.45$, where Xp is the distance between the rotation center of the nozzle vane and the leading edge, and C is the chord length of the nozzle vane. However, in order to realize such a shape, it is necessary to move the position of the rotation center of the nozzle vane to the leading edge side, which conflicts on the constraint 1).

In view of the above, an object of at least one embodiment of the present disclosure is to provide a nozzle vane whereby it is possible to increase the torque in the opening direction provided by exhaust gas in a variable geometry turbocharger.

Solution to the Problems (1) A nozzle vane according to at least one embodiment of the present invention is a nozzle vane for a variable geometry turbocharger, wherein $0.45<(Xp/L)\leq 0.60$ is satisfied, where L is a chord length of the nozzle vane, and Xp is a distance between a leading edge of the nozzle vane and a rotation center of the nozzle vane.

With the above configuration (1), compared with a nozzle vane of $(Xp/L)<0.45$, the distance from the rotation center of the turbine wheel of the variable geometry turbocharger to the pressure surface in the vicinity of the leading edge of the nozzle vane is increased. In the variable geometry turbocharger, the exhaust gas having passed through the turbine scroll of spiral shape forms an arc-shaped curved flow in a respective flow passage formed between adjacent nozzle vanes. This flow is convexly curved toward the pressure surface which defines the respective flow passage. In a free vortex, generally, the flow velocity of the fluid increases toward the inner side. When this principle is applied to the flow of the exhaust gas that is curved convexly toward the pressure surface, as the distance from the rotation center of the turbine wheel to the pressure surface in the vicinity of the leading edge of the nozzle vane increases, the flow velocity of the exhaust gas along the pressure surface in the vicinity of the leading edge of the nozzle vane decreases, so that the static pressure generated on the pressure surface in the vicinity of the leading edge increases. When the static pressure generated on the pressure surface in the vicinity of the leading edge increases, the static pressure difference between the pressure side and the suction side in the vicinity of the leading edge increases. Thus, it is possible to increase the torque in the opening direction provided by the exhaust gas to the nozzle vane.

(2) A nozzle vane according to at least one embodiment of the present disclosure is a nozzle vane for a variable geometry turbocharger, having an airfoil including a leading edge, a trailing edge, a pressure surface, and a suction surface at least in a center position in a blade height direction. The airfoil satisfies $0\leq (W1_{max}/L1)<0.05$, where $W1_{max}$ is a maximum value of a distance from a first line segment connecting two points on the suction surface at 10% to 60% chord positions from the leading edge toward the trailing edge to a given point on the suction surface between the two points, and L1 is a length of the first line segment, wherein the chord positions of the two points are at least 10% apart from each other.

When the exhaust gas mass flow rate is large, the rotation angle of the nozzle vane in the opening direction increases. Accordingly, the exhaust gas enters the nozzle vane from the turbine scroll at an angle such that separation occurs on the suction surface. Thus, the static pressure decreases on the suction surface, so that the torque in the opening direction provided to the nozzle vane is increased. With the above configuration (2), since the suction surface has a substantially flat portion, the separation on the suction surface is significant, compared with a configuration in which the entire suction surface is convexly curved. Thus, when the exhaust gas mass flow rate is large, it is possible to increase the torque in the opening direction provided to the nozzle vane.

(3) In some embodiments, in the above configuration (1), the nozzle vane has an airfoil including a leading edge, a trailing edge, a pressure surface, and a suction surface at least in a center position in a blade height direction. The airfoil satisfies $0 \leq (W1_{max}/L1) < 0.05$, where $W1_{max}$ is a maximum value of a distance from a first line segment connecting two points on the suction surface at 10% to 60% chord positions from the leading edge toward the trailing edge to a given point on the suction surface between the two points, and L1 is a length of the first line segment, wherein the chord positions of the two points are at least 10% apart from each other.

With the above configuration (3), since the effects of both (1) and (2) can be achieved, it is possible to increase the torque in the opening direction provided to the nozzle vane over a wide range of the exhaust gas mass flow rate.

(4) In some embodiments, in the above configuration (2) or (3), the two points are at a 10% chord position and a 60% chord position from the leading edge toward the trailing edge, respectively.

With the above configuration (4), since a substantially flat portion exits in a region where the separation is likely to occur, the separation reliably occurs on the suction surface. Thus, when the exhaust gas mass flow rate is large, it is possible to further increase the torque in the opening direction provided to the nozzle vane.

(5) In some embodiments, in any one of the above configurations (1) to (4), the nozzle vane has an airfoil including a leading edge, a trailing edge, a pressure surface, and a suction surface at least in a center position in a blade height direction. The airfoil satisfies $0 \leq (W2_{max}/L2) < 0.03$, where $W2_{max}$ is a maximum value of a distance from a second line segment connecting the trailing edge and a fixed point on the pressure surface at a 60% chord position from the leading edge toward the trailing edge to a given point on the pressure surface between the trailing edge and the fixed point, and L2 is a length of the second line segment.

With the above configuration (5), a substantially flat portion exists in the vicinity of the trailing edge on the pressure surface. With this configuration, as compared with a configuration in which this portion is concavely curved, the pressure surface approximates the suction surface that forms the flow passage together with the pressure surface. As a result, the flow velocity of the exhaust gas along the pressure surface increases in the vicinity of the trailing edge, so that the static pressure generated on the pressure surface in the vicinity of the trailing edge decreases. When the static pressure generated on the pressure surface in the vicinity of the trailing edge decreases, the static pressure difference between the pressure side and the suction side in the vicinity of the trailing edge decreases. Thus, it is possible to increase the torque in the opening direction provided by the exhaust gas to the nozzle vane.

(6) In some embodiments, in the above configuration (5), the nozzle vane has a hub-side edge and a tip-side edge, and the nozzle vane has the airfoil at least in a region of 30 to 70% of a blade height from the hub-side edge in a direction from the hub-side edge to the tip-side edge.

With the above configuration (6), a substantially flat portion exists in a relatively wide region including the blade height center position in the vicinity of the trailing edge on the pressure surface. Since the range with the decreased static pressure is extended as the substantially flat portion is extended in the blade height direction, it is possible to further increase the torque in the opening direction provided by the exhaust gas to the nozzle vane.

(7) In some embodiments, in the above configuration (5) or (6), in the airfoil, a camber line at an equal distance from the pressure surface and the suction surface is linear at least in a range from the leading edge to a 60% chord position from the leading edge toward the trailing edge, and the camber line does not intersect a chord line connecting the leading edge and the trailing edge between the leading edge and the trailing edge.

With the above configuration (7), it is possible to prevent a complicated configuration of the suction surface even when the pressure surface has the above configuration (5) or (6).

(8) In some embodiments, in the above configuration (7), in the airfoil, the suction surface is configured such that a curvature of a region connected to the leading edge is greater than a curvature of a region connected to the trailing edge.

When the exhaust gas mass flow rate is large, the rotation angle of the nozzle vane in the opening direction increases. Accordingly, the exhaust gas enters the nozzle vane from the turbine scroll at an angle such that separation occurs in the vicinity of the leading edge on the suction surface. Thus, the static pressure decreases in the vicinity of the leading edge on the suction surface, and the pressure difference between the pressure side and the suction side in the vicinity of the leading edge increases, so that the force (moment) in the opening direction generated on the leading edge side of the nozzle vane increases. When the moment in the opening direction generated on the leading edge side of the nozzle vane increases, the torque in the opening direction provided by the exhaust gas to the nozzle vane is significantly increased, so that the actuator may be damaged. With the above configuration (8), since the curvature and thickness on the leading edge side of the suction surface are increased, the occurrence of separation is suppressed, and the reduction in static pressure on the suction surface in the vicinity of the leading edge is suppressed. Thus, the increase in moment in the opening direction generated on the leading edge side of the nozzle vane is suppressed. Consequently, it is possible to suppress the increase in torque in the opening direction provided by the exhaust gas to the nozzle vane.

Advantageous Effects

According to at least one embodiment of the present disclosure, compared with a nozzle vane of $(Xp/L) < 0.45$, the distance from the rotation center of the turbine wheel of the variable geometry turbocharger to the pressure surface in the vicinity of the leading edge of the nozzle vane is increased. In the variable geometry turbocharger, the exhaust gas having passed through the turbine scroll of spiral shape forms an arc-shaped curved flow in a respective flow passage formed between adjacent nozzle vanes. This flow is convexly curved toward the pressure surface which defines the respective flow passage. In a free vortex, generally, the flow velocity of the fluid increases toward the inner side. When this principle is applied to the flow of the exhaust gas that is curved convexly toward the pressure surface, as the above-described distance increases, the flow velocity of the exhaust gas along the pressure surface in the vicinity of the leading edge of the nozzle vane decreases, so that the static pressure generated on the pressure surface in the vicinity of the leading edge increases. When the static pressure generated on the pressure surface in the vicinity of the leading edge increases, the static pressure difference between the pressure side and the suction side in the vicinity of the leading edge increases. Thus, it is possible to increase the torque in the opening direction provided by the exhaust gas to the nozzle vane.

DETAILED DESCRIPTION

Embodiments of the present invention will now be described in detail with reference to the accompanying drawings. However, the scope of the present invention is not limited to the following embodiments. It is intended that dimensions, materials, shapes, relative positions and the like of components described in the embodiments shall be interpreted as illustrative only and not intended to limit the scope of the present invention.

First Embodiment

Figure 1:
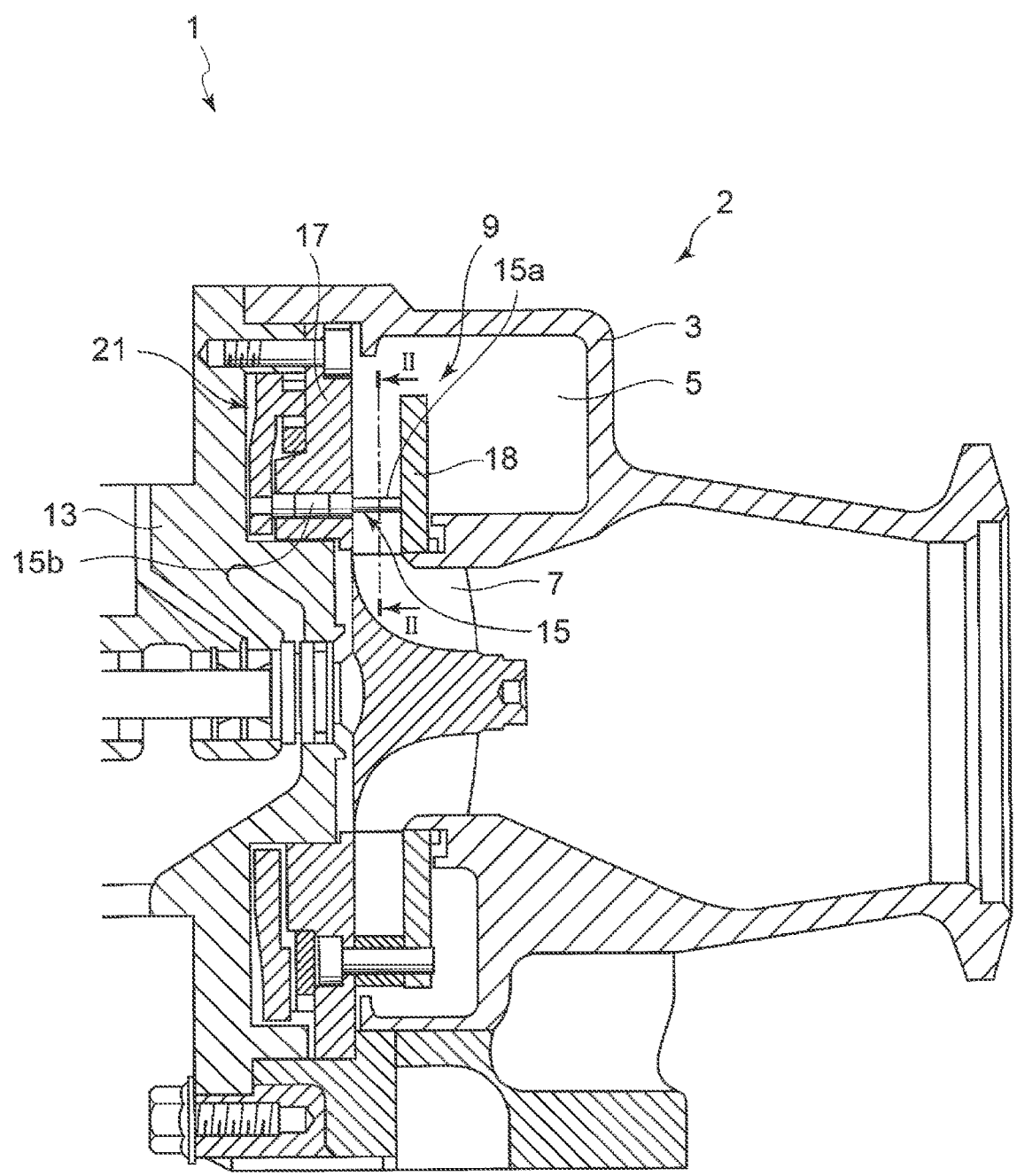
FIG. 1 is a cross-sectional view of a turbine of a variable geometry turbocharger including a nozzle vane according to a first embodiment of the present disclosure.

As shown in FIG. 1, a turbine 2 of a variable geometry turbocharger 1 includes a turbine housing 3 having a turbine scroll 5 of spiral shape, a turbine wheel 7 rotatably disposed on the radially inner side of the turbine scroll 5 in the turbine housing 3, and a variable nozzle mechanism 9 for controlling the flow passage area of the exhaust gas flowing from the turbine scroll 5 to the turbine wheel 7.

The variable nozzle mechanism 9 includes a nozzle 15, a nozzle mount 17 fixed to a bearing housing 13, and a nozzle plate 18. The nozzle 15 has a plurality of nozzle vanes 15a disposed so as to surround the turbine wheel, and a nozzle shaft 15b fixed to each nozzle vane 15a. Each nozzle shaft 15b is rotatably supported to the nozzle mount 17. Each nozzle shaft 15b is connected to an actuator (not shown) via a link mechanism 21. Each nozzle shaft 15b rotates by the torque provided by the actuator. With rotation of each nozzle shaft 15b, the nozzle vane 15a rotates.

Figure 2:
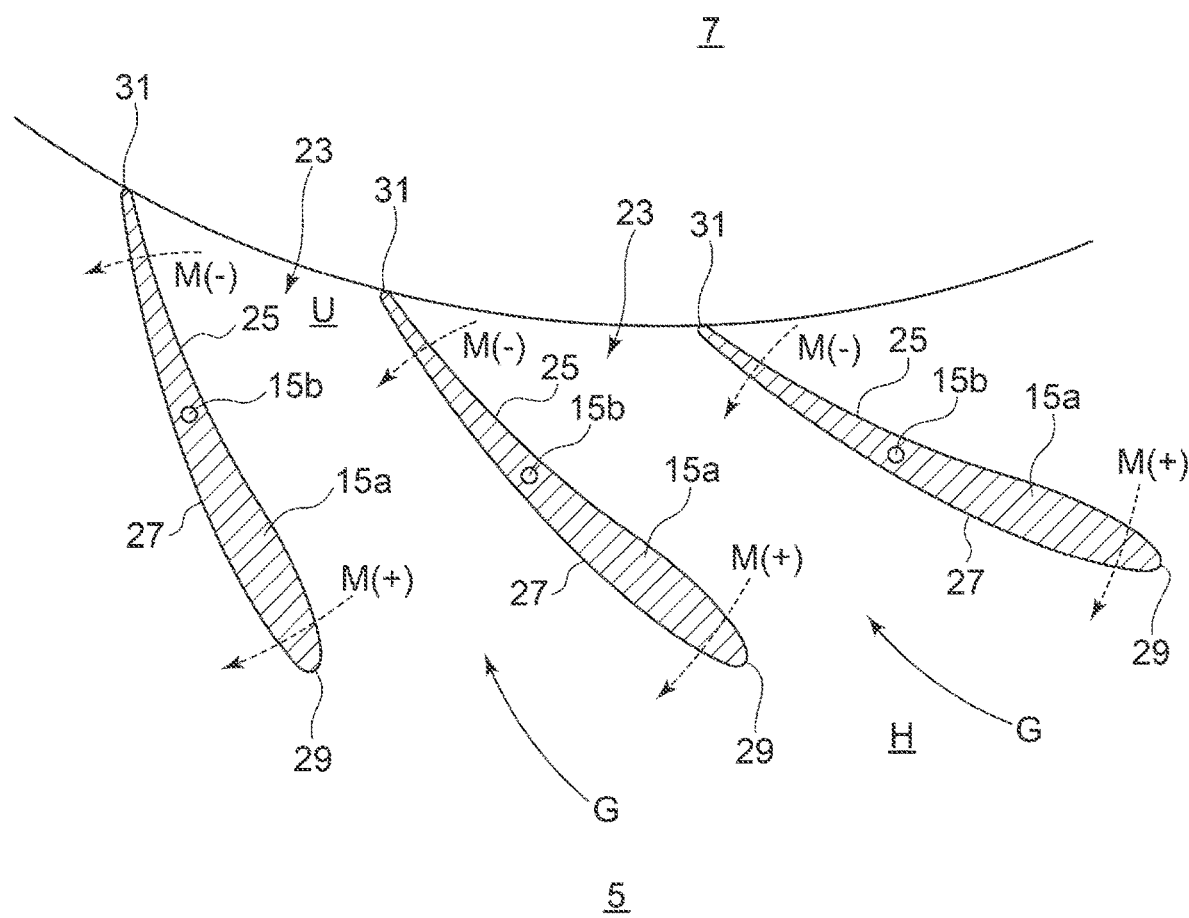
FIG. 2 is a cross-sectional view taken along line II-II in FIG. 1.

As shown in FIG. 2, a flow passage 23 is formed between adjacent nozzle vanes 15a, 15a, through which the exhaust gas G having passed through the turbine scroll 5 flows. Across the flow passage 23, a side of the turbine scroll 5 on the outer peripheral side is a high-pressure side H due to the exhaust gas G, and a side of the turbine wheel 7 on the inner peripheral side is a low-pressure side U. The exhaust gas having passed through the turbine scroll 5 flows into the flow passage 23 at a certain flow angle. At this time, the pressure is increased on the pressure surface 25 which faces the flow, while the pressure is low on the suction surface 27. Due to this pressure difference, with the nozzle shaft 15b being the center of rotation, moment M(+) in the direction of opening the flow passage 23 is applied to the leading edge 29 of the nozzle vane 15a, and moment M(−) in the direction of closing the flow passage 23 is applied to the trailing edge 31 of the nozzle vane 15a. The torque provided by the exhaust gas G to the nozzle vane 15a is defined by the balance of the moments M(−) and M(+).

Figure 3:
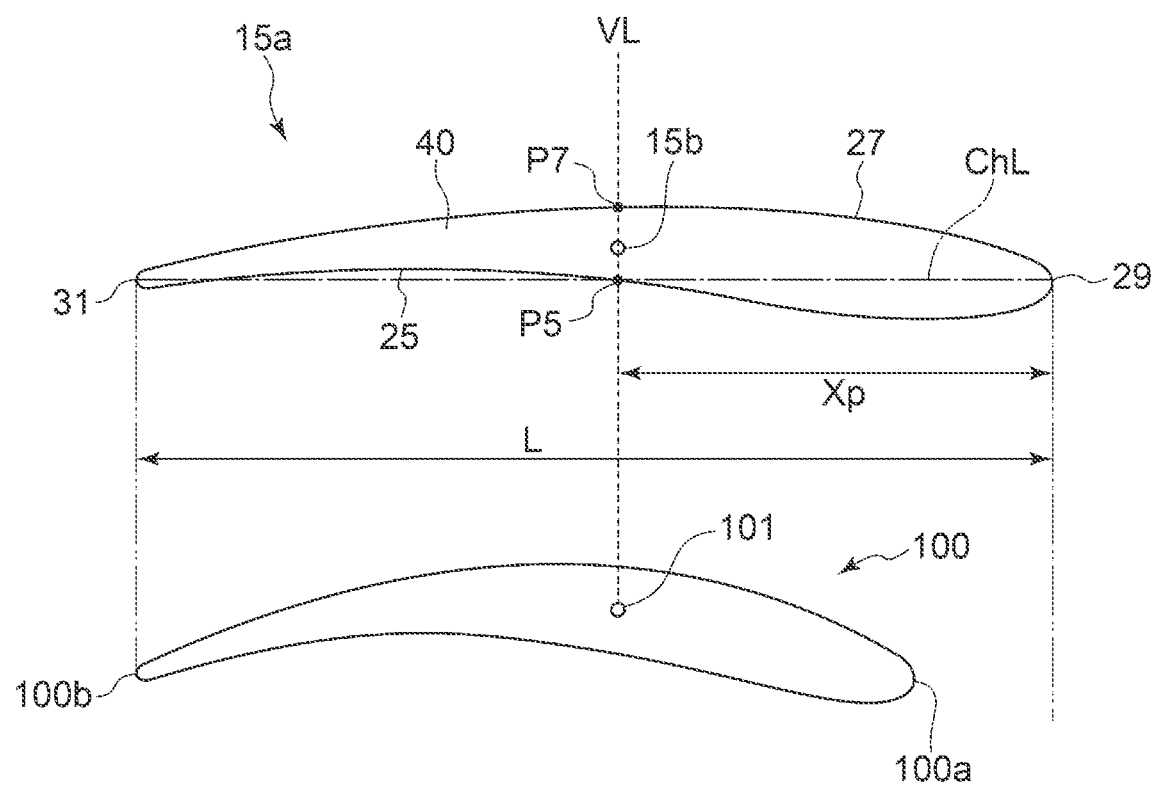
FIG. 3 is a diagram showing the airfoil in the blade height center position of the nozzle vane according to the first embodiment of the present disclosure.

FIG. 3 shows an airfoil 40 in the blade height center position of the nozzle vane 15a. It satisfies $0.45 < (Xp/L) \le 0.60$, where L is the distance between the leading edge 29 and the trailing edge 31, i.e., the chord length of the nozzle vane 15a, and Xp is the distance between the leading edge 29 and the nozzle shaft 15b, i.e., the distance between the leading edge 29 and the rotation center of the nozzle vane 15a. In the airfoil 40, when VL is a virtual line passing through the nozzle shaft 15b and perpendicular to the chord line ChL, and P5 and P7 are respective intersections between the virtual line VL and the pressure surface 25 or the suction surface 27 of the nozzle vane 15a, the nozzle shaft 15b is positioned on the virtual line VL between the intersections P5 and P7.

FIG. 3 also shows a nozzle vane 100 satisfying $(Xp/L) < 0.45$ in parallel to the nozzle vane 15a satisfying the above condition. When the nozzle vane 15a and the nozzle vane 100 are arranged so that their rotation centers (nozzle shaft 101) are in the same position in the longitudinal direction, the trailing edges 31 and 100b are in the same position in the longitudinal direction. Thus, the position of the rotation center in the variable geometry turbocharger and the position of the trailing edge 31 in the fully open state of the nozzle vane 15a may be unchanged from the nozzle vane 100. On the other hand, the position of the leading edge 29 of the nozzle vane 15a in the longitudinal direction is farther away from the rotation center than that of the leading edge 100a of the nozzle vane 100.

Next, the operation of the variable geometry turbocharger 1 will be described. As shown in FIG. 2, according to the flow rate of the exhaust gas G from the turbine scroll 5, the actuator (not shown) rotates each nozzle shaft 15b via the link mechanism 21 (see FIG. 1), and the rotation of each nozzle shaft 15b rotates the nozzle vane 15a. At this time, the nozzle vane 15a is rotated with a torque that is the sum of the torque provided by the actuator, the torque provided by the exhaust gas G, and the friction that acts upon rotation of each nozzle vane 15a. When each nozzle vane 15a rotates, the flow passage area of each flow passage 23 changes, i.e., the opening degree of the nozzle 15 changes, so that the opening degree control for the nozzle 15 is performed based on the flow rate of the exhaust gas G.

Figure 4A:
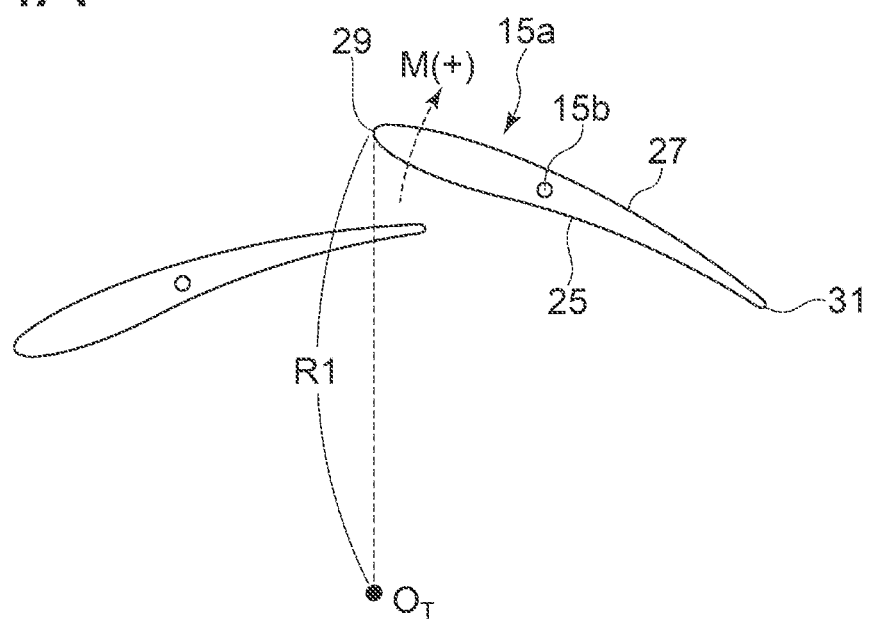
FIGS. 4A and 4B are diagrams for describing the principle of increasing the torque in the opening direction with respect to the nozzle vane according to the first embodiment of the present disclosure.

The exhaust gas G having passed through the turbine scroll 5 (see FIG. 1) of spiral shape forms an arc-shaped curved flow in each flow passage 23. This flow is convexly curved toward the pressure surface 25 which defines the flow passage 23. In a free vortex, generally, the flow velocity of the fluid increases toward the inner side. When this principle is applied to the flow of the exhaust gas G that is curved convexly toward the pressure surface 25, as shown in FIG. 4A, as the distance R1 from the rotation center $O_T$ of the turbine wheel to the pressure surface 25 in the vicinity of the leading edge 29 of the nozzle vane 15a increases, the flow velocity of the exhaust gas along the pressure surface 25 in the vicinity of the leading edge 29 of the nozzle vane 15a decreases.

Figure 4B:
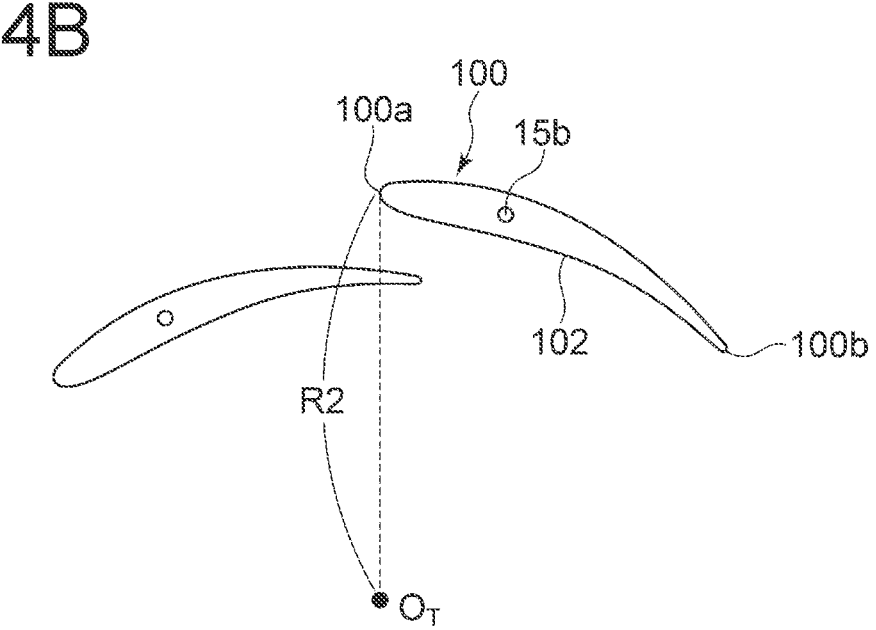

As described with reference to FIG. 3, the position of the leading edge 29 of the nozzle vane 15a in the longitudinal direction is farther away from the rotation center than that of the leading edge 100a of the nozzle vane 100. Accordingly, as shown in FIGS. 4A and 4B, the distance R1 is greater than the distance R2 from the rotation center $O_T$ of the turbine wheel to the pressure surface 102 in the vicinity of the leading edge 100a of the nozzle vane 100 (R1>R2). As a result, in the nozzle vane 15a, as compared with the nozzle vane 100, the flow velocity of the exhaust gas along the pressure surface 25 in the vicinity of the leading edge 29 decreases, so that the static pressure generated on the pressure surface 25 in the vicinity of the leading edge 29 increases. When the static pressure generated on the pressure surface 25 in the vicinity of the leading edge 29 increases, the static pressure difference between the pressure surface 25 side and the suction surface 27 side in the vicinity of the leading edge 29 increases. Thus, since the moment M(+) in the opening direction on the leading edge 29 side increases, it is possible to increase the torque in the opening direction provided by the exhaust gas to the nozzle vane 15a.

Second Embodiment

Next, the nozzle vane according to the second embodiment will be described. Although the configuration of the suction surface 27 is not particularly stated in the first embodiment, in the nozzle vane according to the second embodiment, with respect to the first embodiment, the configuration of the suction surface 27 is limited. In the second embodiment, the same constituent elements as those in the first embodiment are associated with the same reference numerals and not described again in detail.

Figure 5:
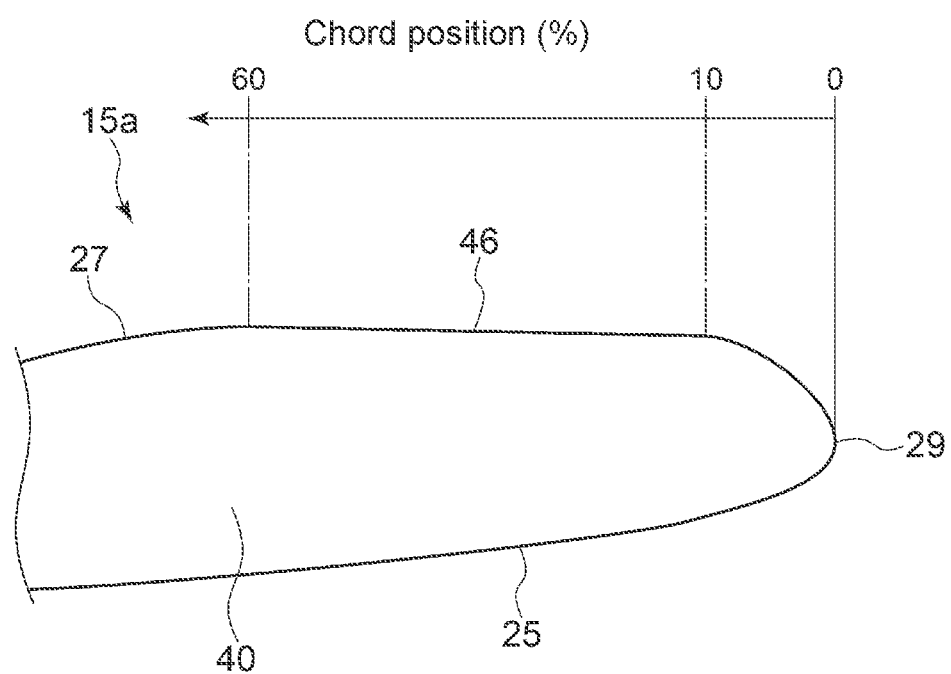
FIG. 5 is an enlarged view of the suction surface of the airfoil in the blade height center position of the nozzle vane according to a second embodiment of the present disclosure.

As shown in FIG. 5, in the airfoil 40, when a chord position is defined in a direction from the leading edge 29 to the trailing edge 31, the suction surface 27 includes a linear portion 43 in a range from the 10% chord position to the 60% chord position. In other words, the suction surface 27 has a flat portion 46 in a range of 10% to 60% chord positions in the blade height center position of the nozzle vane 15a. The configuration is otherwise the same as that of the first embodiment.

Figure 6:
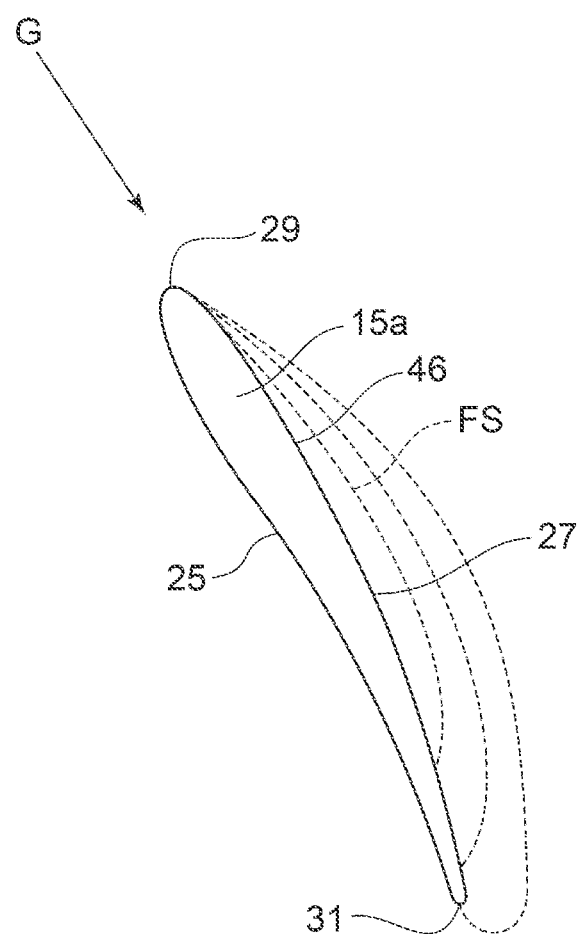
FIG. 6 is a diagram for describing the principle of increasing the torque in the opening direction with respect to the nozzle vane according to the second embodiment of the present disclosure.

As described with reference to the first embodiment, when the exhaust gas mass flow rate is large, the rotation angle of the nozzle vane 15a in the opening direction increases. Accordingly, as shown in FIG. 6, the exhaust gas enters the nozzle vane 15a at an angle such that separation occurs on the suction surface 27. In the second embodiment, since the flat portion 46 is formed on the suction surface 27 in a range of 10% to 60% chord positions, the separation FS easily occurs, compared with the case where the suction surface 27 has no flat portion. When the separation FS occurs on the suction surface 27, the static pressure decreases on the suction surface 27, so that the torque in the opening direction provided to the nozzle vane 15a increases. As a result, when the exhaust gas mass flow rate is large, it is possible to increase the torque in the opening direction provided to the nozzle vane 15a.

Figure 7:
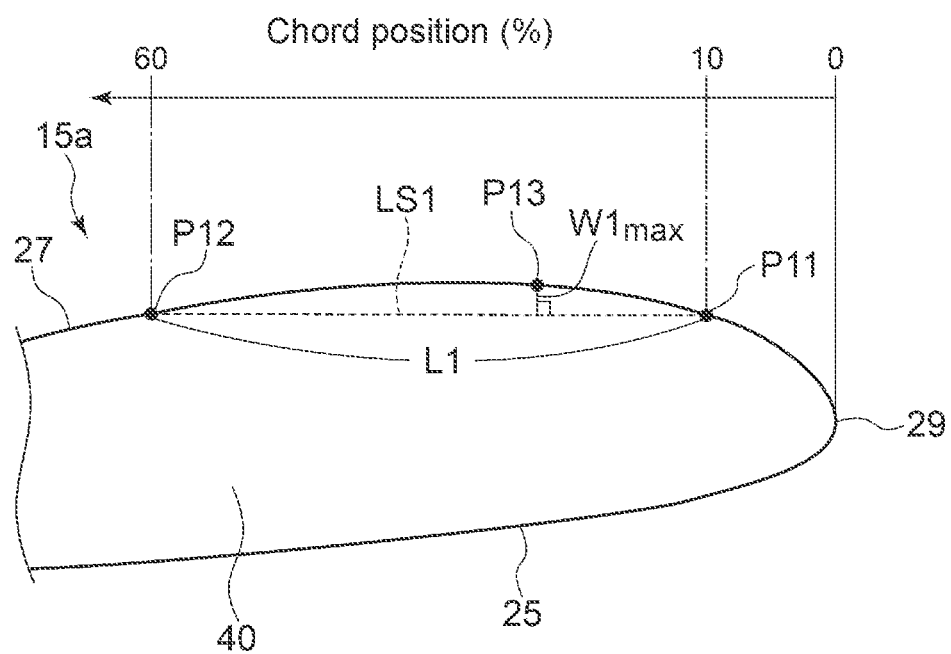
FIG. 7 is an enlarged view of a modified example of the suction surface of the airfoil in the blade height center position of the nozzle vane according to the second embodiment of the present disclosure.

In the second embodiment, the suction surface 27 has the flat portion 46 in a range of 10% to 60% chord positions, but the flat portion 46 does not necessarily have to be completely flat. As shown in FIG. 7, $0 \leq (W1_{max}/L1) < 0.05$ may be satisfied, where $W1_{max}$ is a maximum value of the distance from a first line segment LS1 connecting two points P11 and P12 on the suction surface 27 at 10% to 60% chord positions to a given point P13 on the suction surface 27 between the two points P11, P12, and L1 is the length of the first line segment LS1. In FIG. 7, in a range of 10% to 60% chord positions, the suction surface 27 is curved convexly with respect to the first line segment LS1 in a direction opposite to the pressure surface 25. However, the suction surface 27 may be curved concavely with respect to the first line segment LS1 toward the pressure surface 25, or may have at least one convexly curved portion and at least one concavely curved portion. This embodiment means that the flat portion 46 may not necessarily completely flat, but may be a substantially flat portion including some convex or concave curves.

In the second embodiment, the suction surface 27 has the flat portion 46 or the substantially flat portion in a range of 10% to 60% chord positions, but the embodiment is not limited thereto. When the suction surface 27 includes the flat portion 46, the chord positions of both ends of the flat portion 46 may be at least 10% apart from each other in a range of 10% to 60% chord positions, or when the suction surface 27 includes the substantially flat portion, the chord positions of the two points P11, P12 may be at least 10% apart from each other.

In the second embodiment, with respect to the first embodiment, the configuration of the suction surface 27 is limited such that the suction surface 27 has the flat portion 46 or the substantially flat portion, but the embodiment is not limited thereto. The flat portion 46 or the substantially flat portion may be provided on the suction surface 27 without the configuration of the first embodiment. With this configuration, the torque in the opening direction provided to the nozzle vane 15a can be increased under the condition of high exhaust gas mass flow rate in which the torque of the nozzle vane 15a tends to decrease. Thus, it is possible to increase the torque over a wide range of exhaust gas mass flow rate.

Third Embodiment

Next, the nozzle vane according to the third embodiment will be described. Although the configuration of the pressure surface 25 in the vicinity of the trailing edge 31 is not particularly stated in the first and second embodiments, in the nozzle vane according to the third embodiment, with respect to the first and second embodiments, the configuration of the pressure surface 25 in the vicinity of the trailing edge 31 is limited. In the following, the third embodiment will be described by limiting the configuration of the pressure surface 25 in the vicinity of the trailing edge 31 with respect to the first embodiment, but the third embodiment may be configured by limiting the configuration of the pressure surface 25 in the vicinity of the trailing edge 31 with respect to the second embodiment. In the third embodiment, the same constituent elements as those in the first embodiment are associated with the same reference numerals and not described again in detail.

Figure 8:
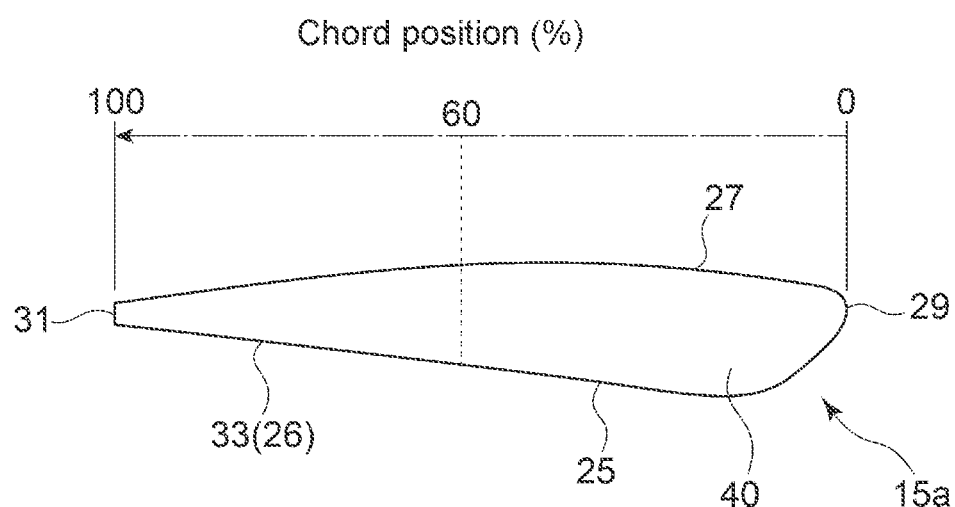
FIG. 8 is a diagram showing the airfoil in the blade height center position of the nozzle vane according to a third embodiment of the present disclosure.

FIG. 8 shows an airfoil 40 in the blade height center position of the nozzle vane 15a. In the airfoil 40, the pressure surface 25 includes a linear portion 33 in a range from the 60% chord position to the 100% chord position. In other words, the pressure surface 25 has a flat portion 26 in a range of 60% to 100% chord positions in the blade height center position of the nozzle vane 15a. The configuration is otherwise the same as that of the first embodiment.

As shown in FIG. 2, the operation of opening degree control of the nozzle 15 based on the flow rate of the exhaust gas G is the same as the first embodiment. When the torque provided by the actuator to the nozzle vane 15a for controlling the nozzle 15 to a predetermined opening degree is small as the flow rate of the exhaust gas G is small, the torque provided by the exhaust gas G is also small, so that the summed torque has a small value in the opening direction of the nozzle 15 or a value in the closing direction of the nozzle 15. As a result, the rotation of each nozzle vane 15a may vary, and the opening degree of the nozzle 15 may vary in the circumferential direction. When such a phenomenon occurs, even when the nozzle 15 is controlled to have a predetermined opening degree, the flow rate of the exhaust gas G flowing through the turbine wheel 7 may vary, which may adversely affect the performance of the engine equipped with the variable geometry turbocharger 1 (see FIG. 1).

Figure 9:
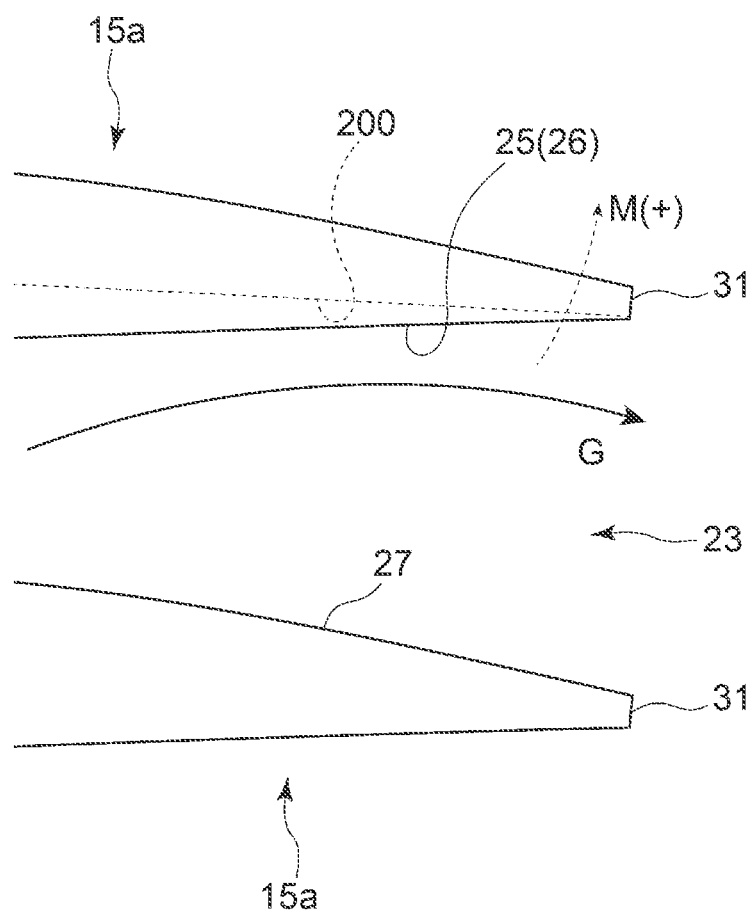
FIG. 9 is a diagram for describing the principle of increasing the torque on the pressure surface in the vicinity of the trailing edge of the nozzle vane according to the third embodiment of the present disclosure.

However, as shown in FIG. 8, in the nozzle vane 15a according to the third embodiment, since the pressure surface 25 has the flat portion 26 in a range of 60% to 100% chord positions in the blade height center position, it is possible to achieve the effect of decreasing the moment M(−) in the closing direction on the trailing edge 31 side of the nozzle vane 15a. The principle of achieving this effect will now be described with reference to FIG. 9.

As described above, the exhaust gas G having passed through the turbine scroll 5 (see FIG. 1) of spiral shape forms an arc-shaped curved flow in each flow passage 23. This flow is convexly curved toward the pressure surface 25 which defines the flow passage 23. In a free vortex, generally, the flow velocity of the fluid increases toward the inner side. When this principle is applied to the flow of the exhaust gas G that is curved convexly toward the pressure surface 25, the closer to the suction surface 27 which defines the flow passage 23 together with the pressure surface 25, the higher the flow velocity of the exhaust gas G.

As with the nozzle vane 15a according to the third embodiment, when the flat portion 26 exists in the vicinity of the trailing edge 31 on the pressure surface 25, as compared with a configuration 200 in which this portion is concavely curved, the pressure surface 25 approximates the suction surface 27 that defines the flow passage 23 together with the pressure surface 25. As a result, the flow velocity of the exhaust gas along the pressure surface 25 increases in the vicinity of the trailing edge 31, so that the static pressure generated on the pressure surface 25 in the vicinity of the trailing edge 31 decreases. When the static pressure generated on the pressure surface 25 in the vicinity of the trailing edge 31 decreases, the static pressure difference between the pressure surface 25 side and the suction surface 27 side in the vicinity of the trailing edge 31 decreases, so that the moment M(−) in the closing direction on the trailing edge 31 side of the nozzle vane 15a decreases.

When the moment M(−) in the closing direction on decreases, the vane torque with respect to the friction can be increased in the direction of opening the nozzle 15. Thus, it is possible to suppress the variation in rotation of each nozzle vane 15a and the variation in opening degree of the nozzle 15 in the circumferential direction. As a result, the nozzle 15 can be reliably controlled to a predetermined opening degree, and the exhaust gas G flows to the turbine wheel 7 at a flow rate according to the opening degree of the nozzle 15. Thus, it is possible to reduce the adverse effect on the performance of the engine equipped with the variable geometry turbocharger 1 (see FIG. 1).

As described above, when the flat portion 26 exists in the vicinity of the trailing edge 31 on the pressure surface 25, as compared with a configuration 200 in which this portion is concavely curved, the pressure surface 25 approximates the suction surface 27 that forms the flow passage 23 together with the pressure surface 25. As a result, the flow velocity of the exhaust gas G along the pressure surface 25 increases in the vicinity of the trailing edge 31, so that the static pressure generated on the pressure surface 25 in the vicinity of the trailing edge 31 decreases. When the static pressure generated on the pressure surface 25 in the vicinity of the trailing edge 31 decreases, the static pressure difference between the pressure surface 25 side and the suction surface 27 side in the vicinity of the trailing edge 31 decreases. Thus, it is possible to increase the torque in the opening direction provided by the exhaust gas G to the nozzle vane 15a.

In the third embodiment, as shown in FIG. 8, the flat portion 46 is formed in a range of 60% to 100% chord positions, but the embodiment is not limited thereto. The flat portion 26 is formed at least in a range of 60% to 100% chord positions, and the flat portion 26 may be further extended from a 60% chord position to the leading edge 29 side.

Figure 10:
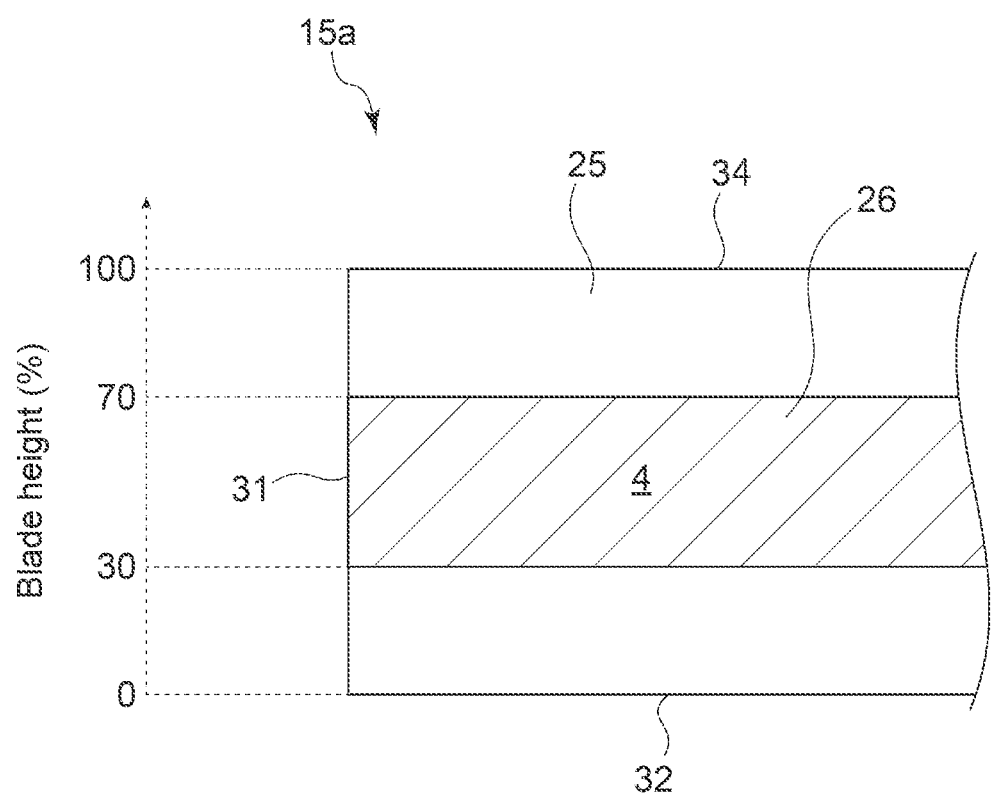
FIG. 10 is a configuration diagram of the pressure surface in the vicinity of the trailing edge of a modified example of the nozzle vane according to the third embodiment of the present disclosure.

In the third embodiment, the flat portion 46 is formed in the blade height center position of the nozzle vane 15a, but the embodiment is not limited thereto. The flat portion 46 is formed at least in the blade height center position of the nozzle vane 15a, and as shown in FIG. 10, the flat portion 26 may be formed at least in a region A of 30 to 70% blade height from the hub-side edge 32 in a direction from the hub-side edge 32 to the tip-side edge 34. Since the range with the decreased static pressure is extended as the flat portion 26 is extended in the blade height direction, it is possible to decrease the moment M(−) (see FIG. 9) in the closing direction on the trailing edge 31 side of the nozzle vane 15a. Accordingly, in order to decrease the moment M(−) in the closing direction, the flat portion 26 may be formed in a wider region than the region A. The flat portion 26 may be formed over the entire blade height from the hub-side edge 32 to the tip-side edge 34.

Figure 11:
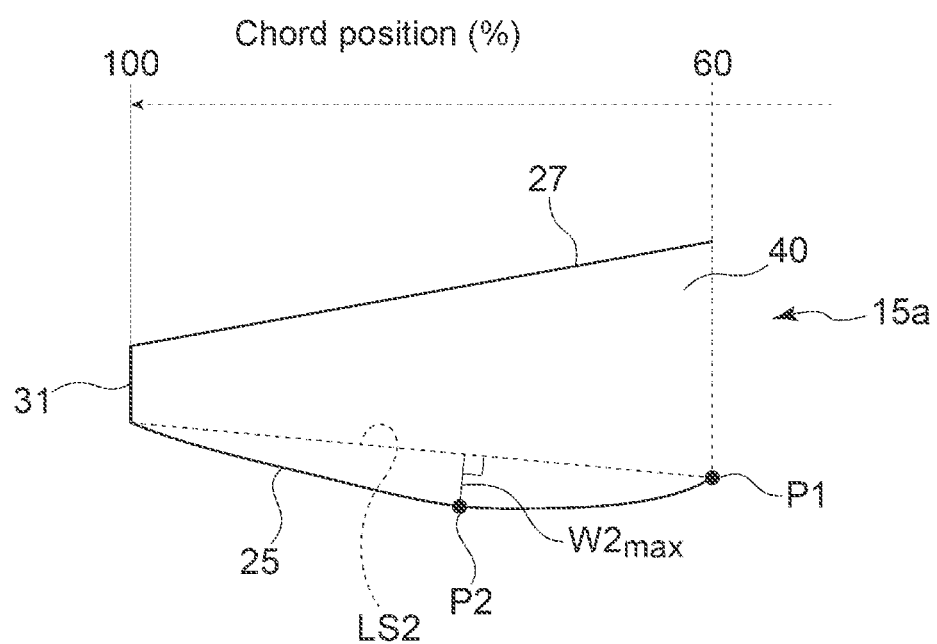
FIG. 11 is a configuration diagram of the pressure surface in the vicinity of the trailing edge of another modified example of the nozzle vane according to the third embodiment of the present disclosure.

In the third embodiment, the flat portion 46 is completely flat, but the embodiment is not limited thereto. As shown in FIG. 11, the airfoil 40 may satisfy $0 \leq (W2_{max} \times /L2) < 0.03$, where $W2_{max}$ is a maximum value of the distance from a second line segment LS2 connecting the trailing edge 31 and a fixed point P1 on the pressure surface 25 at a 60% chord position to a given point P2 on the pressure surface 25 between the trailing edge 31 and the fixed point P1, and L2 is the length of the second line segment LS2. In FIG. 11, in a range of 60% to 100% chord positions, the pressure surface 25 is curved convexly with respect to the second line segment LS2 in a direction opposite to the suction surface 27. However, the pressure surface 25 may be curved concavely with respect to the second line segment LS2 toward the suction surface 27, or may have at least one convexly curved portion and at least one concavely curved portion. This embodiment means that the flat portion 26 may not necessarily completely flat, but may be a substantially flat portion including some convex or concave curves.

Fourth Embodiment

Next, the nozzle vane according to the fourth embodiment will be described. Although the configuration of the suction surface 27 is not particularly stated in the third embodiment, in the nozzle vane according to the fourth embodiment, with respect to the third embodiment, the configuration of the suction surface 27 is limited. In the fourth embodiment, the same constituent elements as those in the third embodiment are associated with the same reference numerals and not described again in detail.

Figure 12:
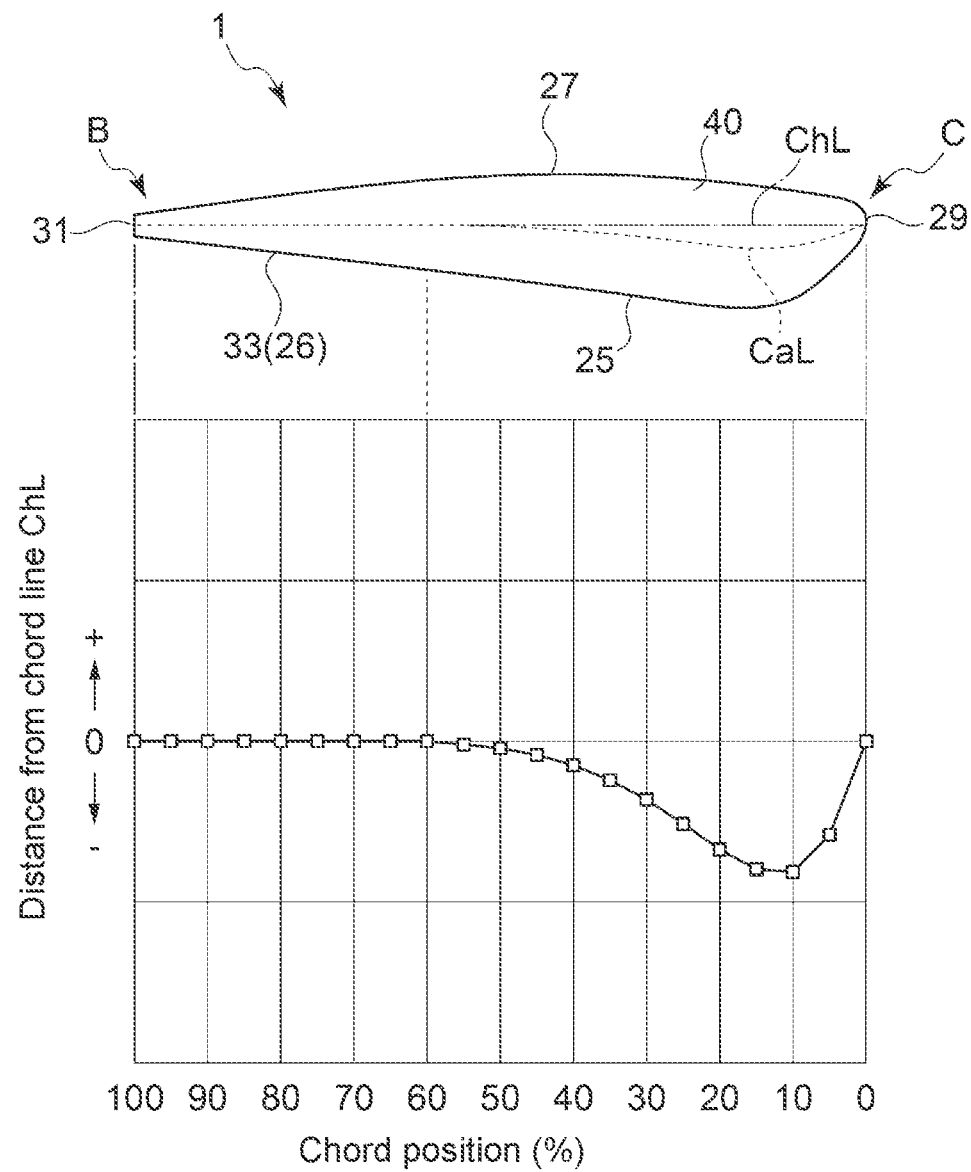
FIG. 12 is a diagram showing the airfoil in the blade height center position of the nozzle vane according to a fourth embodiment of the present disclosure.

As shown in FIG. 12, the nozzle vane 15a according to the fourth embodiment of the present disclosure has an airfoil 40 with the pressure surface 25 of the same shape as the third embodiment. On the other hand, with respect to the pressure surface 25 of the same shape as the third embodiment, the suction surface 27 is shaped such that the camber line CaL at an equal distance from the pressure surface 25 and the suction surface 27 has the following feature. The configuration is otherwise the same as that of the third embodiment.

The graph of FIG. 12 shows the shape of the camber line CaL in the airfoil 40 of the nozzle vane 15a according to the fourth embodiment of the present disclosure. In this graph, the horizontal axis represents the chord position of the nozzle vane 15a, and the vertical axis represents the distance from the chord line ChL connecting the leading edge 29 and the trailing edge 31. The distance is taken as positive in a direction from the chord line ChL to the suction surface 27.

The camber line CaL is linear in a range of 60% to 100% chord positions. The camber line CaL is curved with respect to the chord line ChL on the pressure surface 25 side in a range of 0% to 60% chord positions. Accordingly, the camber line CaL does not intersect the chord line ChL between the leading edge 29 and the trailing edge 31. In other words, the distance from the chord line ChL to the camber line CaL does not change from a negative value to a positive value between the leading edge 29 and the trailing edge 31 (no inflexion point at which the sign of the distance changes exist between the leading edge 29 and the trailing edge 31). In the nozzle vane 15a according to the fourth embodiment of the present disclosure, since the camber line CaL is shaped in this way in the airfoil 40 with the pressure surface 25 of the same shape as the third embodiment of the present disclosure, it is possible to prevent the configuration of the suction surface 27 from being complicated.

Further, in the airfoil 40 of the nozzle vane 15a according to the fourth embodiment of the present disclosure, the suction surface 27 may be configured such that the curvature of a region C connected to the leading edge 29 is greater than the curvature of a region B connected to the trailing edge 31.

As described with reference to the second embodiment, when the exhaust gas mass flow rate is large, the opening degree of the nozzle 15 increases, so that the rotation angle of the nozzle vane in the opening direction increases. Accordingly, the exhaust gas enters the nozzle vane 15a from the turbine scroll 5 (see FIG. 1) at an angle such that separation occurs in the vicinity of the leading edge 29 on the suction surface 27. Thus, the static pressure decreases in the vicinity of the leading edge 29 on the suction surface 27, so that the moment M(+) (see FIG. 2) in the opening direction generated on the leading edge 29 side of the nozzle vane 15a increases. When the moment M(+) in the opening direction generated on the leading edge 29 side of the nozzle vane 15a increases, the torque in the opening direction provided by the exhaust gas to the nozzle vane 15a is significantly increased, so that the actuator may be damaged. With the configuration of the fourth embodiment, since the curvature and thickness on the leading edge 29 side of the suction surface 27 are increased, the occurrence of separation is suppressed, and the reduction in static pressure on the suction surface 27 in the vicinity of the leading edge 29 is suppressed. Thus, the increase in moment M(+) in the opening direction generated on the leading edge 29 side of the nozzle vane 15a is suppressed. Consequently, it is possible to suppress the increase in torque in the opening direction provided by the exhaust gas to the nozzle vane 15a.

Figure 13:
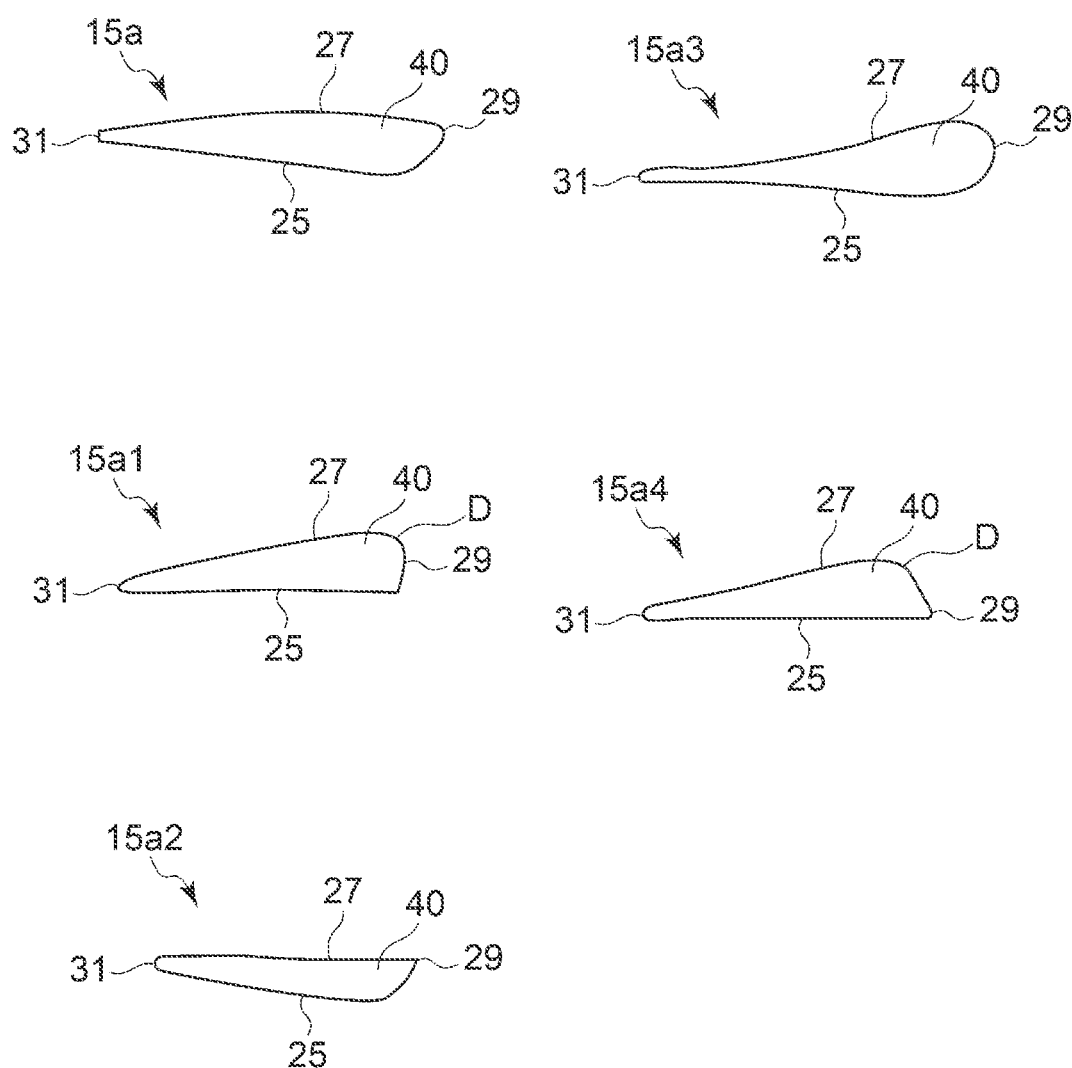
FIG. 13 is a diagram showing the airfoil in the blade height center position of modified examples of the nozzle vane according to the fourth embodiment of the present disclosure.

FIG. 13 shows, in addition to the nozzle vanes 15a which have been specifically described in the third and fourth embodiments, modified examples thereof. A nozzle vane 15a1, which is one of the modified examples, has the airfoil 40 in which the pressure surface 25 is substantially flat from the trailing edge 31 to the leading edge 29, compared with the nozzle vane 15a. A nozzle vane 15a2, which is another of the modified examples, has the airfoil 40 in which the suction surface 27 is substantially flat from the trailing edge 31 to the leading edge 29, compared with the nozzle vane 15a. A nozzle vane 15a3, which is another of the modified examples, has the airfoil 40 in which the curvature in the vicinity of the leading edge 29 on the suction surface 27 is increased, compared with the nozzle vane 15a. A nozzle vane 15a4, which is another of the modified examples, has the airfoil 40 in which a portion D with increased curvature on the suction surface 27 is moved to the trailing edge 31 side, compared with the nozzle vane 15a.

REFERENCE SIGNS LIST

1 Variable geometry turbocharger
2 Turbine
3 Turbine housing
5 Turbine scroll
7 Turbine wheel
9 Variable nozzle mechanism
13 Bearing housing
15 Nozzle
15a Nozzle vane
15b Nozzle shaft
17 Nozzle mount
18 Nozzle plate
21 Link mechanism
23 Flow passage
25 Pressure surface
26 Flat portion
27 Suction surface
29 Leading edge
31 Trailing edge
32 Hub-side edge
33 Linear portion
34 Tip-side edge
40 Airfoil
46 Flat portion
B Region connected to trailing edge
C Region connected to leading edge
CaL Camber line ChL Chord line
D Portion with increased curvature
FS Separation
G Exhaust gas
LS1 First line segment
LS2 Second line segment
$O_T$ Rotation center of turbine wheel
P1 Fixed point
P2 Given point on pressure surface between trailing edge and fixed point
P5 Intersection
P7 Intersection
P11 Point on suction surface
P12 Point on suction surface
P13 Point on suction surface
VL Virtual line
Xp Distance between leading edge and rotation center of nozzle vane

The invention claimed is:

1. A nozzle vane for a variable geometry turbocharger, comprising:
   a leading edge, a trailing edge, a pressure surface, a suction surface and a rotation center, where $0.45<(Xp/L)\leq0.60$ is satisfied, where L is a chord length of the nozzle vane, and Xp is a distance between the leading edge of the nozzle vane and the rotation center of the nozzle vane;
   wherein an airfoil of the nozzle vane at least in a center position in a blade height direction of the nozzle vane satisfies $0\leq(W1_{max}/L1)<0.05$, where $W1_{max}$ is a maximum value of a distance from a first line segment connecting two points on the suction surface at 10% to 60% chord positions from the leading edge toward the trailing edge to a given point on the suction surface between the two points, and L1 is a length of the first line segment, wherein the chord positions of the two points are at least 10% apart from each other, and
   wherein the two points are at a 10% chord position and a 60% chord position from the leading edge toward the trailing edge, respectively.

2. A nozzle vane for a variable geometry turbocharger, comprising:
   a leading edge, a trailing edge, a pressure surface, and a suction surface,
   wherein an airfoil of the nozzle vane at least in a center position in a blade height direction of the nozzle vane satisfies $0\leq(W1_{max}/L1)<0.05$, where $W1_{max}$ is a maximum value of a distance from a first line segment connecting two points on the suction surface at 10% to 60% chord positions from the leading edge toward the trailing edge to a given point on the suction surface between the two points, and L1 is a length of the first line segment, wherein the chord positions of the two points are at least 10% apart from each other, and
   wherein the two points are at a 10% chord position and a 60% chord position from the leading edge toward the trailing edge, respectively.

3. The nozzle vane according to claim 1,
wherein the airfoil satisfies $0\leq(W2_{max}/L2)<0.03$, where $W2_{max}$ is a maximum value of a distance from a second line segment connecting the trailing edge and a fixed point on the pressure surface at a 60% chord position from the leading edge toward the trailing edge to a given point on the pressure surface between the trailing edge and the fixed point, and L2 is a length of the second line segment.

4. The nozzle vane according to claim 3,
wherein the nozzle vane has a hub-side edge and a tip-side edge, and
wherein the nozzle vane has the airfoil at least in a region of 30 to 70% of a height from the hub-side edge to the tip-side edge in the blade height direction.

5. The nozzle vane according to claim 3,
wherein, in the airfoil, a camber line at an equal distance from the pressure surface and the suction surface is linear at least in a range from the leading edge to a 60% chord position from the leading edge toward the trailing edge, and the camber line does not intersect a chord line connecting the leading edge and the trailing edge between the leading edge and the trailing edge.

6. The nozzle vane according to claim 5,
wherein, in the airfoil, the suction surface is configured such that a curvature of a region connected to the leading edge is greater than a curvature of a region connected to the trailing edge.

7. The nozzle vane according to claim 2,
wherein the airfoil satisfies $0\leq(W2_{max}/L2)<0.03$, where $W2_{max}$ is a maximum value of a distance from a second line segment connecting the trailing edge and a fixed point on the pressure surface at a 60% chord position from the leading edge toward the trailing edge to a given point on the pressure surface between the trailing edge and the fixed point, and L2 is a length of the second line segment.

8. The nozzle vane according to claim 7,
wherein the nozzle vane has a hub-side edge and a tip-side edge, and
wherein the nozzle vane has the airfoil at least in a region of 30 to 70% of a height from the hub-side edge to the tip-side edge in the blade height direction.

9. The nozzle vane according to claim 7,
wherein, in the airfoil, a camber line at an equal distance from the pressure surface and the suction surface is linear at least in a range from the leading edge to a 60% chord position from the leading edge toward the trailing edge, and the camber line does not intersect a chord line connecting the leading edge and the trailing edge between the leading edge and the trailing edge.

10. The nozzle vane according to claim 9,
wherein, in the airfoil, the suction surface is configured such that a curvature of a region connected to the leading edge is greater than a curvature of a region connected to the trailing edge.

* * * * *